United States Patent [19]

Fukukawa et al.

[11] Patent Number: 5,067,841
[45] Date of Patent: Nov. 26, 1991

[54] BALL JOINT

[75] Inventors: Takao Fukukawa, Fukuroi; Keiichiro Suzuki, Hamana, both of Japan

[73] Assignee: Kabushiki Kaisha Somic Ishikawa, Tokyo, Japan

[21] Appl. No.: 641,484

[22] Filed: Jan. 15, 1991

[30] Foreign Application Priority Data

Jan. 16, 1990 [JP] Japan .................................. 2-6667

[51] Int. Cl.$^5$ .................................................... F16C 11/00
[52] U.S. Cl. ................................... 403/140; 403/138; 403/135
[58] Field of Search .......................... 403/140, 135, 138

[56] References Cited

U.S. PATENT DOCUMENTS 3,560,035 2/1971 Kindel .................................... 403/140
4,720,205 1/1988 Ito ..................................... 403/135 X

*Primary Examiner*—Andrew V. Kundrat
*Attorney, Agent, or Firm*—Morrison Lawfirm

[57] ABSTRACT

A ball joint uses a single-piece ball seat of hard plastic that has high rigidity, high load durability and elasticity, to prevent premature fracture of the ball seat caused by manufacturing imperfections in the socket of the ball joint. A preload contact surface is resilient supported at the top of the ball seat to enable uniform distribution of preload of the ball to the socket. At assembly of the ball joint, a cylindrical lower portion of the ball seat cylinder is reshaped into an inwardly bowed surface to envelop the lower portion of the ball. A thin annular wall at the periphery of the preload contact surface of the ball seat defines a thin annular space between itself and the upper portion of the ball seat cylinder to provide the preload contact surface with expansion space. Additional elasticity can be built into the ball seat by providing slits at the junction of the preload contact surface periphery and the base of the thin annular wall.

6 Claims, 6 Drawing Sheets

BALL JOINT

BACKGROUND OF THE INVENTION

1. Field of the Invention

The present invention relates to a ball joint of, for example, the steering or suspension system of a vehicle. More particularly, the invention relates to a ball joint having a single-piece ball seat of hard plastic.

2. Description of the Prior Art

A ball joint normally consists of a ball socket, in which a ball seat is fitted, and a ball stud with its ball portion slidably inserted in the ball seat. A ball joint, used in a vehicle's suspension system, must have a ball that slides smoothly in its ball seat, have high rigidity and high load durability. To meet these requirements, hard plastic is frequently used for the ball seat. However, if there is a slight irregularity in the inner diameter of the ball socket, a ball seat made of hard plastic tends to fracture if excessive friction exists between the ball seat and the ball. However, some friction is essential for the ball joint to operate smoothly. Since an appropriate amount of tolerable friction is not easily determined, the inner diameter of the socket is conventionally made to a very strict tolerance, resulting in high manufacturing costs.

In an attempt to alleviate this problem, Japanese Patent Publication Laid-Open No. 45161/1975 describes a ball seat with an upper inner surface having a more steeply inclined inner curvature than the spherical surface of the ball installed therein. This configuration utilizes the reaction force created by upward thrust on the upper inner surface of the ball seat as preload to the ball portion at the time of assembly of the ball portion of the ball stud. The ball seat, with slits to provide elasticity, is installed prior to assembly of the ball portion and holds the ball portion therein. This ball joint has a space between the ball seat and an end member (cover) above the ball seat, preventing the ball seat from touching the cover, thus providing space for expansion.

Essentially, the ball joint described in the above patent publication applies preload from the ball seat to the ball portion. However, the slits in the ball seat alone are not sufficient to ensure adequate elasticity to obtain a proper degree of stable friction. Moreover, since the ball seat has slits, the available load bearing area is proportionately reduced. Reducing the load bearing area in this manner is a disadvantage when compared to other ball joints with the same ball size because it may require using a larger ball joint to compensate for the reduced load bearing area.

In summary, conventional ball joints have problems, i.e., the inner diameter of the socket must be manufactured to a very close tolerance to prevent fracturing of the hard plastic ball seat and/or the ball joint has poor load durability.

OBJECTS AND SUMMARY OF THE INVENTION

Accordingly, it is an object of the present invention to provide a ball joint that overcomes the drawbacks of the prior art.

It is a further object of the present invention to provide a ball joint having smooth slidability, high rigidity and high load durability.

It is a still further object of the present invention to provide a ball joint with a single-piece ball seat, having a socket with as much tolerance in size as a ball joint with a two-piece ball seat.

The invention provides a ball joint having a socket with a hard plastic single-piece ball seat fitted against the inner surface of the socket, and a ball stud with a ball at its upper end slidably fitted against the inner surface of the spherical ball seat. A thin annular wall is formed at the top edge of the upper cylindrical portion of the ball seat by folding the thin annular wall over on itself. A thin annular space is thus created between the upper cylindrical portion of the ball seat and the thin annular wall. A preload contact surface is provided at the top of the ball seat starting at the base of the thin annular wall and extending to a projecting ring at its inner perimeter.

Using a fixture, the ball seat is preloaded and assembled by applying downward pressure on the preload contact surface of the ball seat. The ball seat is forcibly slid between the ball of the ball stud and the inner surface of the socket. The lower cylindrical portion of the ball seat wraps itself around the lower surface of the ball and assumes a bowed shape due to the inward bowed shape of the lower portion of the socket.

The close surface contact between the lower portion of the ball seat and the lower portion of the ball minimizes movement of the ball when load is applied to the ball joint assembly. In addition, the ball receives a uniform preload through the preload contact surface, which has elasticity to allow some expansion provided by the thin annular wall expanding into the thin annular space.

In another embodiment of the invention, friction is stabilized to a narrow range by adding slits around the periphery of the preload contact surface that extend into the thin annular wall. The slits provide additional elasticity and enable the preload to made even more uniform.

Briefly stated, the present invention provides a ball joint that uses a single-piece ball seat of hard plastic that has high rigidity, high load durability and elasticity, to prevent premature fracture of the ball seat caused by manufacturing imperfections in the socket of the ball joint. A preload contact surface is resiliently supported at the top of the ball seat to enable uniform distribution of preload of the ball to the socket. At assembly of the ball joint, a cylindrical lower portion of the ball seat cylinder is reshaped into an inwardly bowed surface to envelop the lower portion of the ball. A thin annular wall at the periphery of the preload contact surface of the ball seat defines a thin annular space between itself and the upper portion of the ball seat cylinder to provide the preload contact surface with expansion space. Additional elasticity can be built into the ball seat by providing slits at the junction of the preload contact surface periphery and the base of the thin annular wall.

According to an embodiment of the invention, there is provided a ball joint for use with a ball affixed to a ball stud, comprising: a socket, a ball seat, means for conforming the ball seat to a portion of the ball in a vicinity of the ball stud, a preload contact element, means for resiliently suspending the preload contact element from the ball seat, the preload contact element having an inner surface, the inner surface having an initial shape having a radius of curvature that is less than a radius of curvature of the ball, when the inner surface is in an unstressed condition, and means for securing the ball seat with the inner surface in a final shape conforming to the curvature of the ball, whereby deformation of the inner surface from the initial shape to the final shape applies a predetermined amount of prestress to the ball.

According to a feature of the invention, there is provided a ball joint for supporting a ball comprising: a socket, the socket including a generally cylindrical upper portion and a bowed lower portion forming an inwardly bowed inner surface, a ball seat, the ball seat including a generally cylindrical lower portion fittable into the cylindrical upper portion of the socket, a preload contact element, means for resiliently affixing the preload contact element to an upper end of the cylindrical upper portion, means for permitting a lower portion of the generally cylindrical lower portion of the ball seat to be forced into conforming contact with the bowed inner surface to form a bowed lower seat portion, an inner surface of the bowed lower seat portion having a radius of curvature about equal to a radius of curvature of the ball, means for permitting the preload contact element to be held in resiliently urged contact with an upper portion of the ball; and means for retaining the ball seat in the socket.

Briefly stated, a ball joint using a single-piece ball seat of hard plastic has high rigidity, high load durability, and elasticity preventing premature fracture of the ball seat caused by manufacturing imperfections in the socket of the ball joint. A preload contact surface at the top of the ball seat enables uniform distribution of preload of the ball to the socket. At assembly of the ball joint, the lower portion of the ball seat cylinder is reshaped to envelop the lower portion of the ball. A thin annular wall formed at the periphery of the preload contact surface of the ball seat has a thin annular space between the thin annular wall and the upper portion of the ball seat cylinder to provide the ball seat with expansion space. Additional elasticity can be built into the ball seat by providing slits at the junction of the preload contact surface periphery and the base of the thin annular wall.

According to an embodiment of the invention there is provided: a ball joint comprising, a socket with a curved lower end, a ball seat lining the inner surface of the socket, a ball stud with a ball and a stud portion and the ball seat having an elasticity for conforming to a shape of the ball.

According to a feature of the invention there is provided a ball joint, wherein the ball seat comprises: an annular wall formed by folding a top edge of the ball seat, the annular wall spaced apart from an upper cylindrical wall below the top edge of the ball seat, a spherical preload contact surface at the base of said annular wall extending inward to a ring at the top of the ball seat, the outer junction of the annular wall and the periphery of the preload contact surface forming a spherical tongue, an outward tapered spherical portion being formed on an inner surface of the ball seat between the top edge and a bottom edge of the ball seat, a lower cylindrical portion of the ball seat enveloping a lower portion of the ball, responsive to a preload from the preload contact surface, and the tongue expandable into a space between the annular wall and the upper cylindrical wall of the ball seat from surface pressure of the ball.

According to another feature of the invention, there is provided: a ball joint, wherein the ball seat has a plurality of slits at the junction of the preload contact surface and the annular wall.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
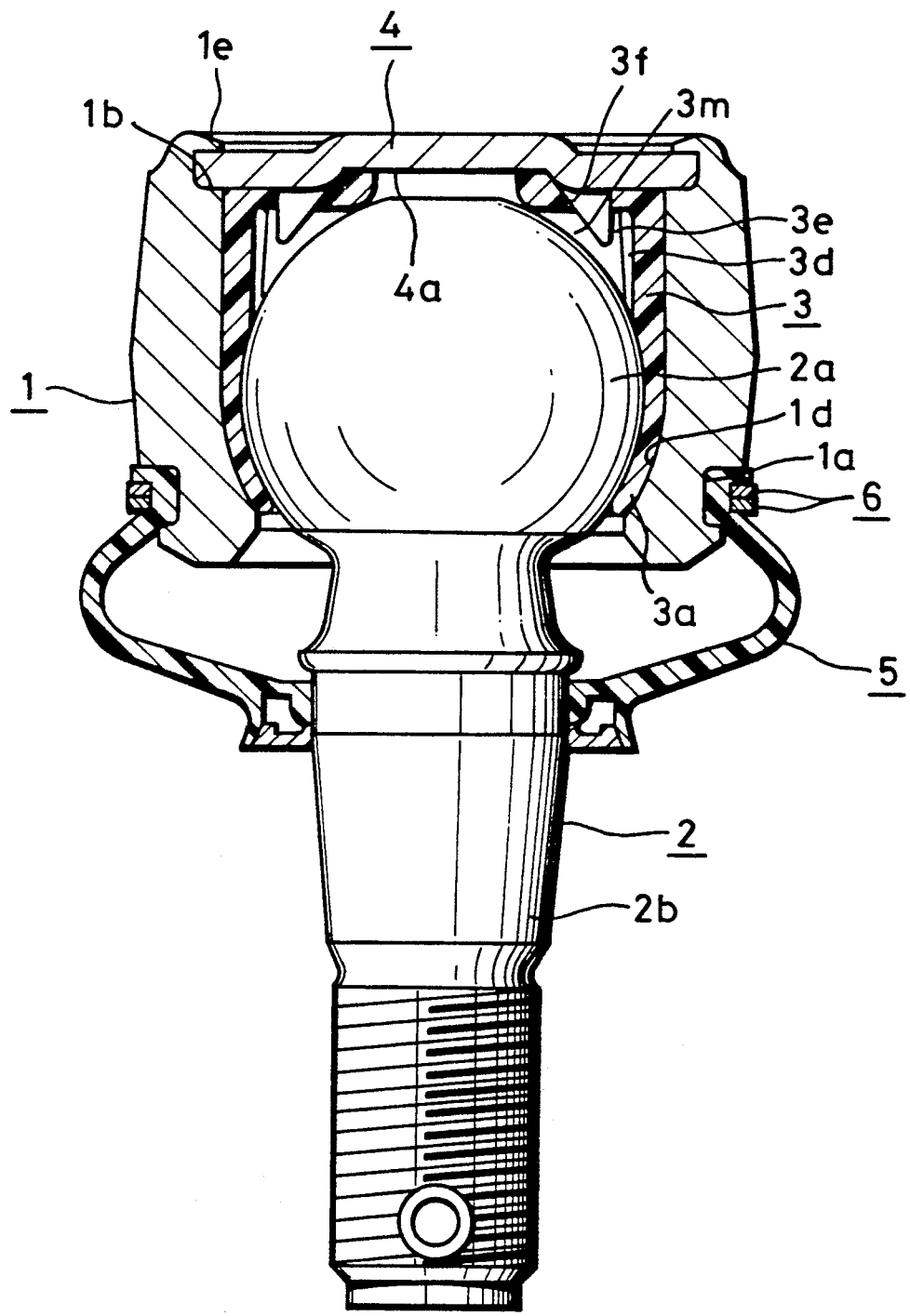
FIG. 1 is a cross section of an embodiment of a ball joint according to the present invention.

Referring to FIG. 1, a bowed lower seat portion 3a of a ball seat 3 is fitted between a socket 1 and a ball 2a attached to a ball stud 2. The top of ball seat 3 is held by a plug bottom 4a of a plug 4 fixed to the top of socket 1. A dust seal 5 is fitted to the area from a stud portion 2b of ball stud 2 to an encircling groove 1a at a lower part of socket 1. The upper end of dust seal 5 is fastened into encircling groove 1a by a clip 6.

Figure 2:
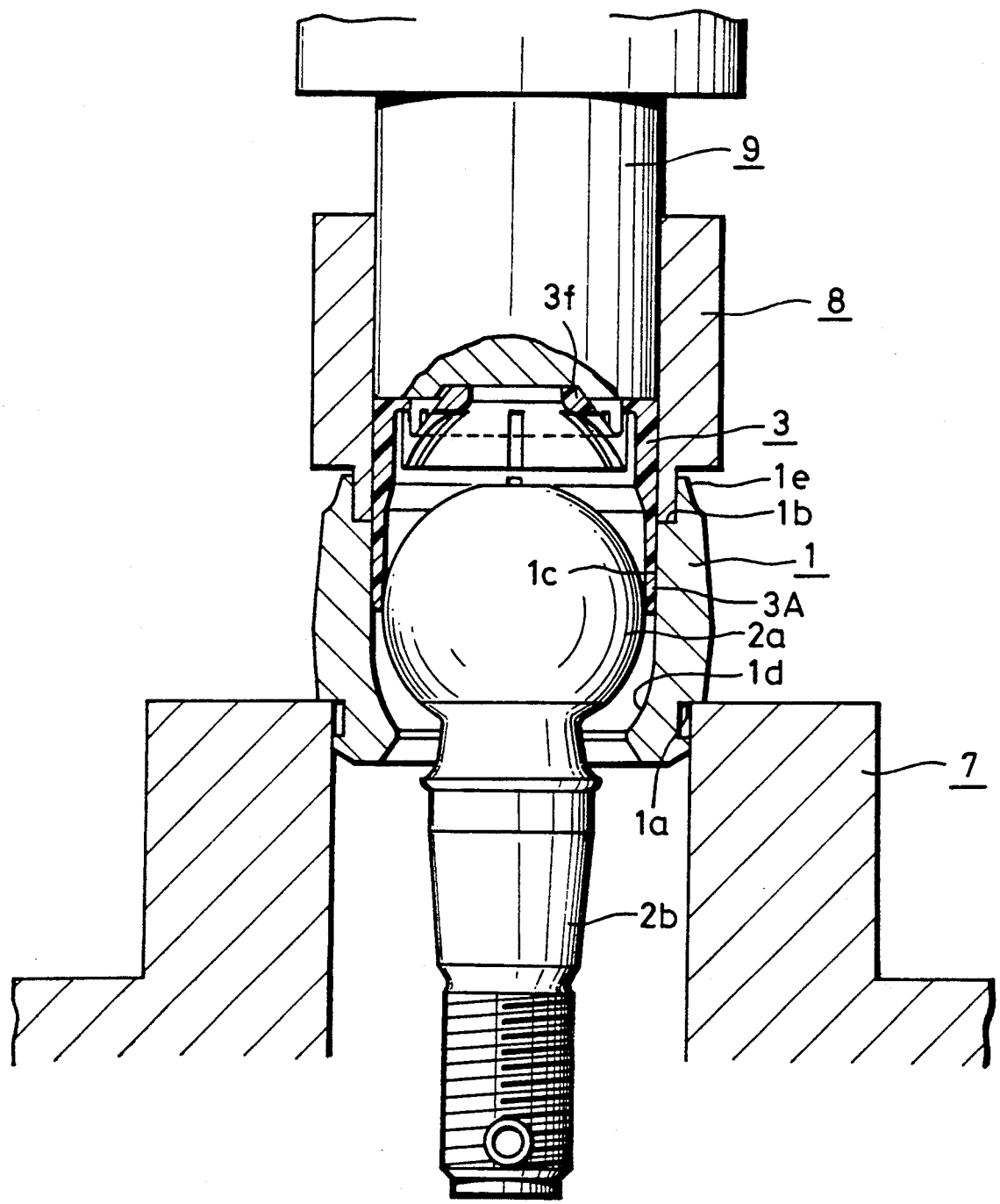
FIG. 2 is a cross section of the invention in a partially assembled state.
Figure 3:
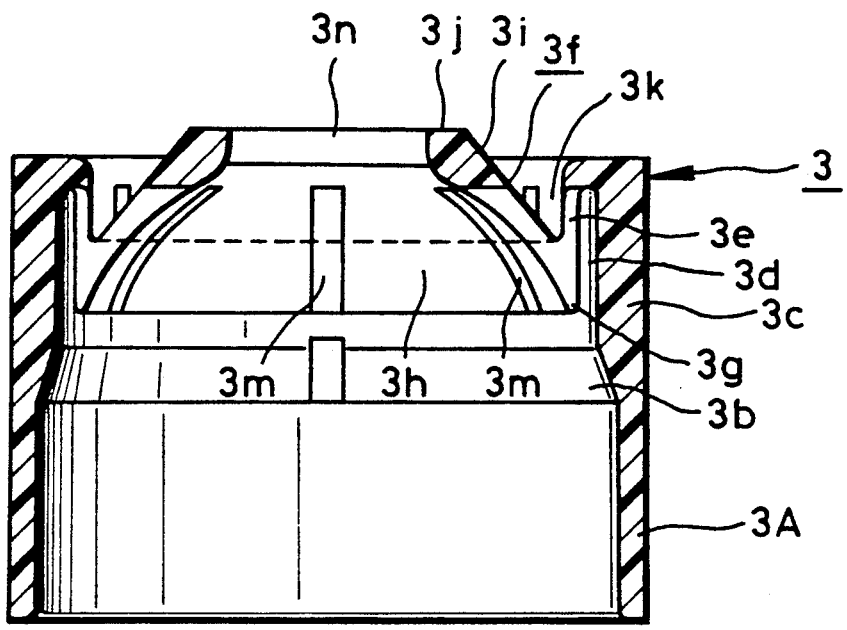
FIG. 3 is a cross section of the ball seat of the invention before assembly.
Figure 4:
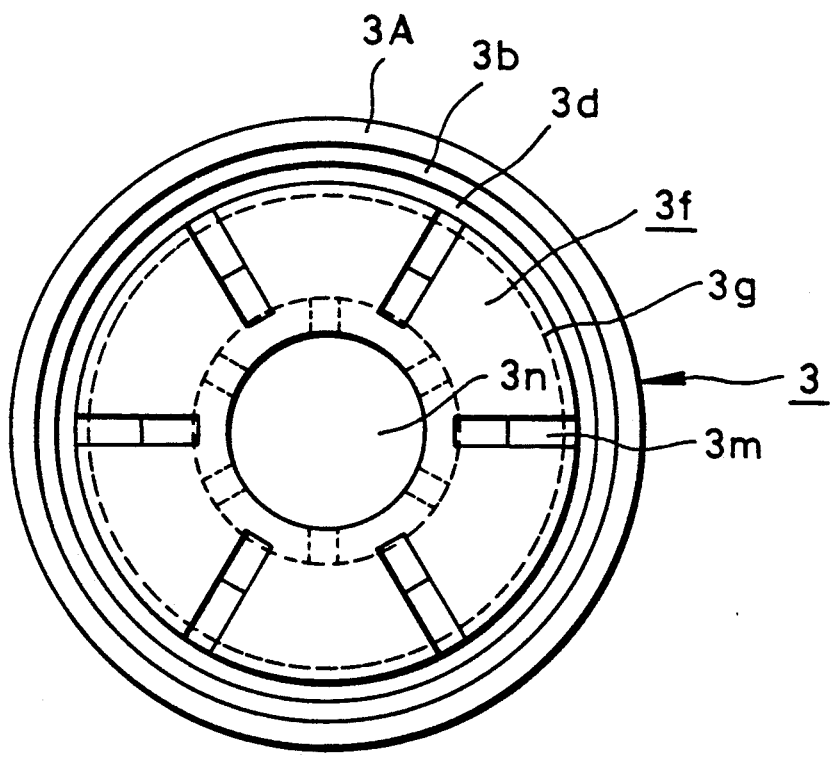
FIG. 4 is a bottom view of the ball seat of the invention before assembly.
Figure 5:
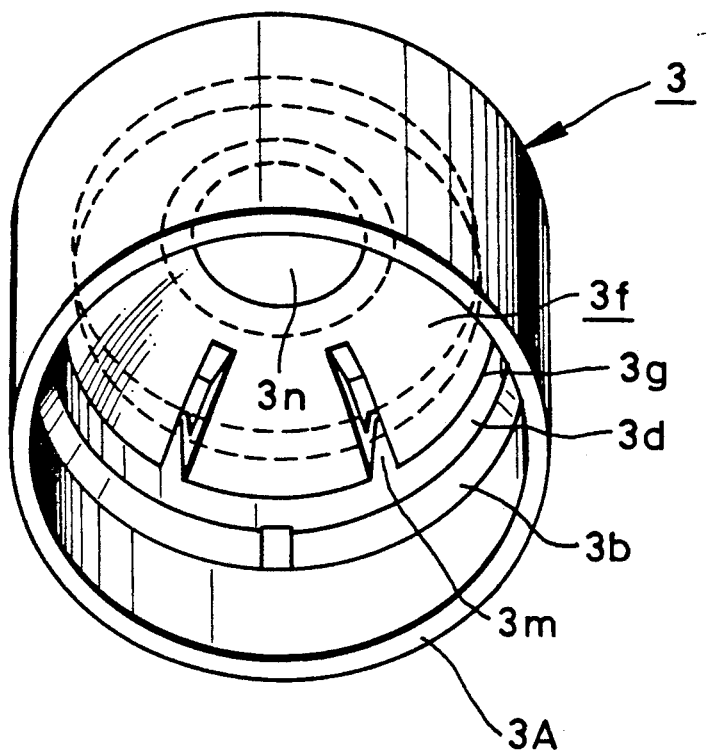
FIG. 5 is an oblique bottom view of the ball seat of the invention.
Figure 6:
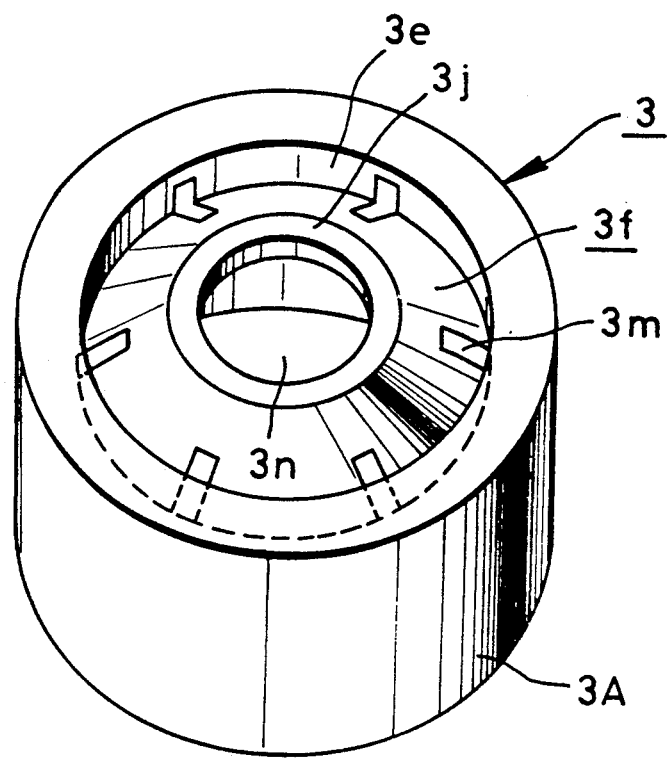
FIG. 6 is an oblique top view of the ball seat of the invention.

Referring to FIG. 2, the assembly procedure of the above members is described. Encircling groove 1a of socket 1 is engaged by a receiving base 7. A seat guide 8 is set against a shoulder 1b on an upper part of socket 1. Ball seat 3 is then inserted from a cylindrical inner surface 1c to a bowed inner surface 1d of socket 1 using downward pressure from a pressure applying head 9, forcibly sliding ball seat 3 downward along the inner surface of seat guide 8. A lower cylindrical portion 3A of ball seat 3 is reshaped between bowed inner surface 1d of socket 1 and the lower curvature of ball 2a, causing lower cylindrical portion 3A to assume a similar bowed shape and thus becomes bowed lower seat portion 3a.

Referring again to FIG. 1, plug 4 is fixed to the assembly by setting it against shoulder 1b at the upper part of socket 1. A top end 1e of socket 1 is swaged over the perimeter of plug 4 to seal the top end of socket 1. Dust seal 5 is then fitted around encircling groove 1a of socket 1 and fastened with clip 6. This completes assembly of the ball joint.

Referring to FIGS. 3 through 7, ball seat 3 is a single unit of hard plastic, for example, polyacetal, which has high load durability and excellent slidability. Ball seat 3 has a tapered spherical portion 3b joining an upper cylindrical portion 3c and lower cylindrical portion 3A. Lower cylindrical portion 3A is reshaped into bowed lower seat portion 3a (FIG. 1) at assembly. A thin annular wall 3e is formed by folding the top end of upper cylindrical portion 3c inward, thus creating a thin annular space 3d between upper cylindrical portion 3c and thin annular wall 3e.

A spherically shaped preload contact surface 3f is formed with its outer periphery at the base of thin annular wall 3e and its inner rim ending at a projecting ring 3j with a ball seat opening 3n at the top of ball seat 3. Preload contact surface 3f has a spherically shaped tongue 3g at the base of thin annular wall 3e, an inner preload contact surface 3h, an exterior preload contact surface 3i, and projecting ring 3j at its center. A V-groove 3k is formed between the outer periphery of preload contact surface 3f and thin annular wall 3e. A plurality of slits 3m are radially formed in the area from preload contact surface 3f to thin annular wall 3e.

Figure 7:
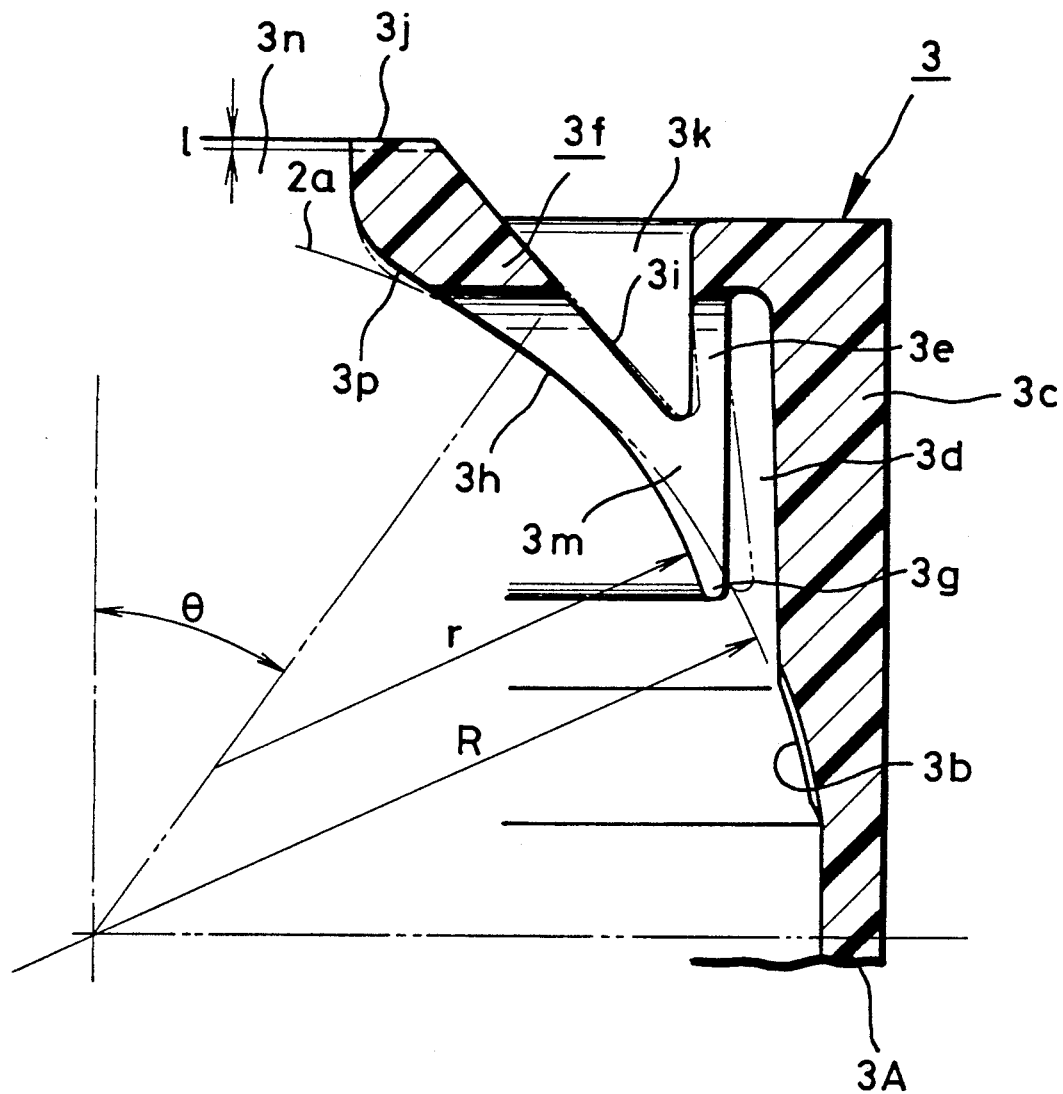
FIG. 7 is an enlarged cross section of the upper part of the ball seat.

Referring to FIG. 7, ball seat 3 interacts with ball 2a in the following manner: projecting ring 3j, at the apex of preload contact surface 3f and the uppermost part of ball seat 3, is pushed downward by pressure from plug bottom 4a of plug 4 (FIG. 1). Preload contact surface 3f applies preload to ball 2a, causing projecting ring 3j to deform and expand into an upper space 3p between the upper part of inner preload contact surface 3h and ball 2a. Tongue 3g of ball seat 3 has a generally arc-shaped inner surface, with a radius of curvature that is somewhat less than radius R of ball 2a. A center of the arc is on the line at angle theta from an axis of ball seat 3. At the time of assembly, tongue 3g is pushed outward by ball 2a, as shown in dot-dash line. As a result, tongue 3g produces a reaction force that applies preload from diagonally above ball 2a towards the center of the sphere.

A plurality of slits 3m, passing from preload contact surface 3f to thin annular wall 3e of ball seat 3 stabilizes the preload. When projecting ring 3j of ball seat 3, under pressure from plug bottom 4a of plug 4, is pushed downward, preload is applied to ball 2a. Preload contact surface 3f of ball seat 3 expands in the direction of its outer perimeter. However, the elasticity provided by slits 3m and thin annular wall 3e, prevents excessive stress on the assembly.

Although tongue 3g of ball seat 3 is forced to expand in a diagonally upward direction by ball 2a of ball stud 2, excessive stress is reduced because tongue 3g recedes into annular space 3d. The position of receded tongue 3g is shown in FIG. 7 as a broken line. Since the reaction of these components to preload force is ascertainable, a suitable preload condition can easily be obtained.

The preload obtained is maintained for a long time because ball 2a is enveloped between tapered spherical portion 3b of ball seat 3 and bowed lower seat portion 3a, which is reshaped along bowed inner surface 1d at the lower part of socket 1 at the time of assembly. Therefore, undesirable movement of ball 2a is minimized even when external force is applied, thus reducing stress on the upper part of ball seat 3.

As explained above, although ball seat 3 is a single-piece unit, its upper part and lower part have different functions. The upper part of ball seat 3 is for applying preload, and the lower part of ball seat 3 for load bearing.

Figure 8:
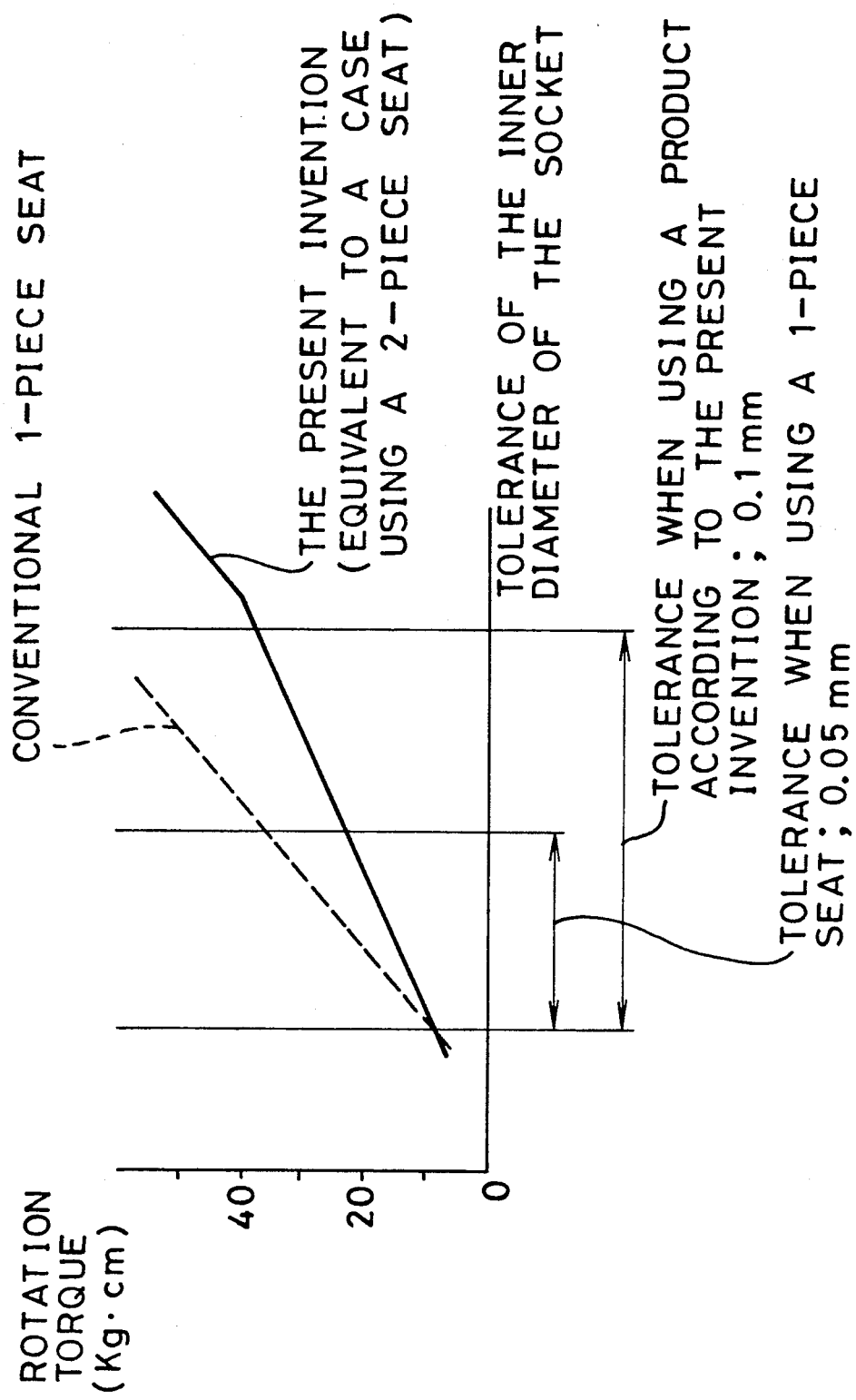
FIG. 8 is a graph comparing the tolerance of the inner diameter of the socket of a ball joint of the invention and that of a conventional ball joint.

FIG. 8 is a graph comparing the relationship between the friction and the tolerance of the socket diameter of a ball joint using ball seat 3 according to the invention with that of a ball joint using a conventional single-piece ball seat. The graph shows that friction (rotational torque) in relation to the tolerance of the inner diameter of the socket of a product of the present invention is about half that of a conventional ball joint, making it more stable. Slits 3m may be omitted from ball seat 3 if the friction requirements are not strict.

In summary, preload contact surface 3f of ball seat 3 applies preload to ball 2a and lower cylindrical portion 3A. Lower cylindrical portion 3A is thereby reshaped around the lower portion of ball 2a by bowed inner surface 1d of socket 1 at the time of assembly to form bowed lower seat portion 3a. Therefore, in spite of being a single unit of hard plastic, ball seat 3 has excellent friction applying ability as well as good load durability due to the close contact of bowed lower seat portion 3a against the lower surface of ball 2a. Envelopment of ball seat 3 around ball 2a in this manner provides the ball joint with high rigidity (high load durability) and smooth sliding ability for a long period of time.

Since the base of preload contact surface 3f has thin annular wall 3e and thin annular space 3d to facilitate shaping of ball seat 3 when applying preload to ball 2a, the preload is stabilized, thereby assuring sufficient elasticity for expansion. An appropriate amount of friction can be set easily without manufacturing the inner diameter of socket 1 to the close tolerance that a conventional single unit ball seat would require. As a result, the precision of the inner diameter of the socket of the present invention can be reduced to the level of tolerance of a two-piece ball seat, thereby reducing manufacturing cost.

Slits 3m, which are radially provided in the area from preload contact surface 3f to thin annular wall 3e of ball seat 3, further increases the elasticity of preload contact surface 3f. Thus, setting of the friction is made even easier, which is advantageous where the range of friction tolerance is narrow.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint for use with a ball affixed to a ball stud, comprising:
    a socket;
    a ball seat;
    means for conforming said ball seat to a portion of said ball in a vicinity of said ball stud;
    a preload contact element;
    said preload contact element having an inner surface;
    said inner surface having an initial shape having a radius of curvature that is less than a radius of curvature of said ball, when said inner surface is in an unstressed condition;
    means for securing said ball seat with said inner surface in a final shape conforming to said curvature of said ball, whereby deformation of said inner surface from said initial shape to said final shape applies a predetermined amount of prestress to said ball;
    said means for resiliently supporting including a generally cylindrical annular wall affixed at its upper end to an upper portion of said ball seat; and
    a generally annular space between said annular wall and said upper portion, whereby at least a portion of said preload contact element is free to move a limited amount into said annular space, in changing its radius of curvature.

2. A ball joint according to claim 1, wherein said means for conforming includes:
    a bowed inner surface on said socket, adjacent said ball stud;
    a generally cylindrical lower portion on said ball seat;

said ball seat being forced into conforming shape with said bowed inner surface to form a bowed lower seat portion; and said bowed lower seat portion having a radius of curvature substantially equal to said radius of curvature of said ball.

3. A ball joint according to claim 2, wherein said preload contact element includes at least one slit between a portion thereof contacting said ball and said annular space, said at least one slit being effective for increasing a resilience of said preload contact element.

4. A ball joint according to claim 3, wherein said at least one slit includes at least two slits defining opposed edges of a tongue, said tongue being deformable into said annular space during said changing of radius of curvature.

5. A ball joint according to claim 1, wherein said ball seat is one piece.

6. A ball joint for supporting a ball comprising:

a socket;

said socket including a generally cylindrical upper portion and a bowed lower portion forming an inwardly bowed inner surface;

a ball seat;

said ball seat including a generally cylindrical lower portion fittable into said cylindrical upper portion of said socket;

a preload contact element;

means for resiliently fixing said preload contact element to an upper end of said cylindrical upper portion;

means for a lower portion of said generally cylindrical lower portion of said ball seat to be forced into conforming contact with said bowed inner surface to form a bowed lower seat portion;

an inner surface of said bowed lower seat portion having a radius curvature about equal to a radius of curvature of said ball;

means for permitting said preload contact element to be held in resiliently urged contact with an upper portion of said ball;

means for retaining said ball seat in said socket; said means for retaining including a plug fittable into an upper portion of said socket, and a swaged portion retaining said plug in place;

said plug including a plug bottom contacting said preload contact element and applying a predetermined amount of preload through said preload contact element to an upper surface of said ball;

said means for resiliently fixing including;

a generally cylindrical annular wall affixed at its upper end to an upper portion of said ball seat; and a generally annular space between said annular wall and said upper portion, whereby at least a portion of said preload contact element is free to move a limited amount into said annular space in changing its radius of curvature.

* * * * *